(12) United States Patent
Hirayanagi (10) Patent No.: US 7,984,801 B2
(45) Date of Patent: Jul. 26, 2011

(54) FRICTION PLATE FOR WET MULTI-PLATE CLUTCH

(75) Inventor: Tsuyoshi Hirayanagi, Fukuroi (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 748 days.

(21) Appl. No.: 12/014,825

(22) Filed: Jan. 16, 2008

(65) Prior Publication Data

US 2008/0173516 A1  Jul. 24, 2008

(30) Foreign Application Priority Data

Jan. 16, 2007  (JP) .................... 2007-006508

(51) Int. Cl.
*F16D 13/64* (2006.01)
*F16D 13/74* (2006.01)

(52) U.S. Cl. ............... 192/107 R; 192/113.36
(58) Field of Classification Search .............. 192/113.36
See application file for complete search history.

(56) References Cited

U.S. PATENT DOCUMENTS

| | | | | |
|---|---|---|---|---|
| 2,690,248 A | * | 9/1954 | McDowall | 192/113.36 |
| 4,726,455 A | * | 2/1988 | East | 192/107 R |
| 5,776,288 A | * | 7/1998 | Stefanutti et al. | 156/263 |
| 2005/0072649 A1 | * | 4/2005 | Guthrie et al. | 192/107 R |
| 2007/0102258 A1 | * | 5/2007 | Miyazaki et al. | 192/113.36 |
| 2008/0156611 A1 | * | 7/2008 | Hirayanagi | 192/107 R |

FOREIGN PATENT DOCUMENTS

| | | |
|---|---|---|
| JP | 62-98832 U | 6/1987 |
| JP | 62-112324 U | 7/1987 |
| JP | 04-211729 A | 8/1992 |
| JP | 11-141570 A | 5/1999 |
| JP | 2002-181073 A | 6/2002 |
| JP | 2005-036980 A | 2/2005 |
| JP | 2005-76759 A | 3/2005 |

OTHER PUBLICATIONS

Japanese Office Action dated Mar. 17, 2009.

* cited by examiner

*Primary Examiner* — Richard M. Lorence
(74) *Attorney, Agent, or Firm* — Sughrue Mion, PLLC (57) ABSTRACT

In a friction plate 40, segment pieces 42 of a friction material are bonded onto a core plate 40 at intervals in a circumferential direction. 43 denotes a spline tooth. On each segment piece, there are formed a first oil groove which is made to open to an inside-diameter side of the segment piece and has its end portion part-way along the segment piece (hereinafter, referred to as a first oil groove) and a second oil groove which is made to open to an outside-diameter side of the segment piece and has its end portion part-way along the segment piece (hereinafter, referred to as a second oil groove). Segment pieces in which a first oil groove 51 and second oil grooves 61 are pressure molded and segment pieces in which a first oil grooves 52 and second oil grooves 62 are stamped are arranged alternately.

3 Claims, 8 Drawing Sheets

FIG. 8 though there are such pressure molded grooves. However, the engaging torque at the initial stage can be made small and little shock generates at the time of transmission.

FRICTION PLATE FOR WET MULTI-PLATE CLUTCH

BACKGROUND OF THE INVENTION

1. Field of the Invention

The present invention relates to a friction plate for a wet multi-plate clutches for use in a clutch or a brake in an automatic transmission.

2. Description of Related Art

Figure 1:
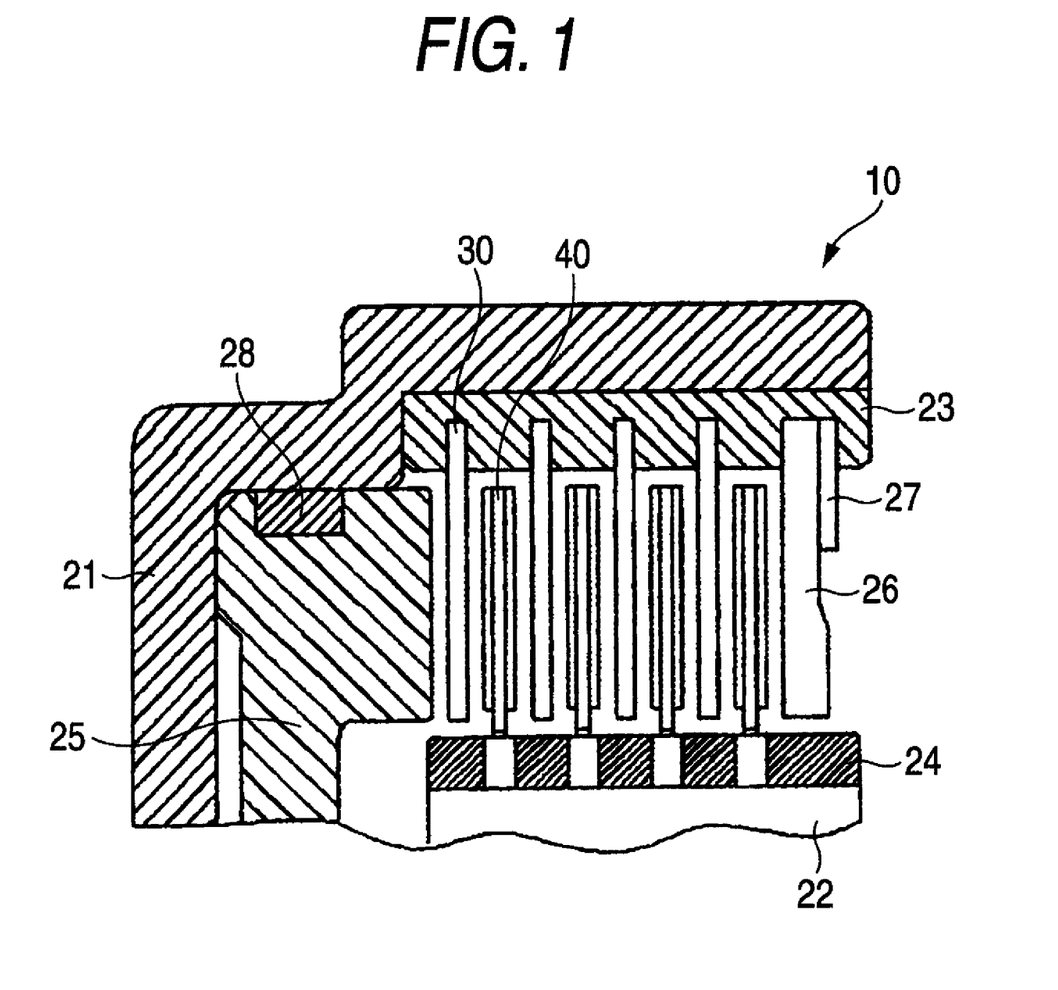
FIG. 1 is a sectional view showing a basic configuration of a wet multi-plate clutch.

FIG. 1 is a sectional view showing a basic configuration of a wet multi-plate clutch 10, in which power is transmitted between a clutch casing 21 and a hub 22 via separator plates 30 and friction plates 40. Reference numeral 23 denotes a spline groove to which the separator plates 30 fit, 24 a spline groove to which the friction plates 40 fit, 25 a piston for pushing the separator plates 30 and the friction plates 40 against a backing plate 26, 27 a snap ring which supports the backing plate 26, and 28 a seal ring.

In recent years, there are more and more demands for further improvement in fuel economy of motor vehicles, and as a part of the improvement in fuel economy, there are also increasing demands for further reduction in dragging torque generated between friction plates and separator plates at idling in automatic transmissions of motor vehicles.

To cope with the demands, there have been considered friction plates which include oil grooves which are closed at end faces in order to facilitate the separation of friction plates and separator plates when a clutch is idle and oil grooves which pass across the friction plate in radially inward and outward directions for supply oil for preventing seizing when the clutch is engaged.

In recent years, in order to improve in gear shift response which is aimed at improving engine performance as well as fuel economy, clearances between friction plates and separator plates are getting narrower than before, and hence, dragging torque between the friction plates and the separator plates tends to increase due to oil film left interposed therebetween when the clutch is idle.

In conventional friction plates, the discharge of oil from friction surfaces was not sufficiently performed, and therefore, the demand for further reduction of dragging torque could not be satisfied. In particular, in a low rotational speed region, the discharge of oil left interposed between the friction plates and the separator plates could not be implemented sufficiently, and therefore, the dragging torque could not be decreased.

SUMMARY OF THE INVENTION

With a view to solving the problem, according to an aspect of the invention, there is provided a friction plate for a wet multi-plate clutch comprising:

a core plate;

at least one first segment piece comprising at least one pressure molded oil groove; and at least one second segment piece comprising at least one stamped oil groove, wherein the first and second segment pieces are made of friction material and are bonded onto the core plate at intervals in a circumferential direction.

In the friction plate of the invention that is configured as has been described above, the dragging torque when the clutch is idle is decreased further, and pores at ends of the pressure molded oil grooves are collapsed, so that oil residing in the friction material is discharged to the friction surface in an initial stage of engagement of the clutch, whereby the occurrence of a biting in the engagement initial stage can be prevented. Furthermore, clearances between the segment pieces constitute through passages of oil for prevention of burning of the friction material.

DETAILED DESCRIPTION OF THE PREFERRED EMBODIMENTS

By forming the oil groove into a V-shape which becomes wider towards its open end, the intake and discharge of oil is performed more smoothly. In addition, by forming the friction material into the segment pieces, the yield of friction material is increased.

Embodiments

FIGS. 2 to 7 are front views of respective embodiments of friction plates 40 according to the invention. Reference numerals in those figures are common thereover, and reference numeral 41 denotes a core plate, 42 a segment piece, and 43 a spline tooth which fit in a hub 22.

In addition, grooves shaded with oblique lines indicate that they are formed through pressure molding.

Figure 2:
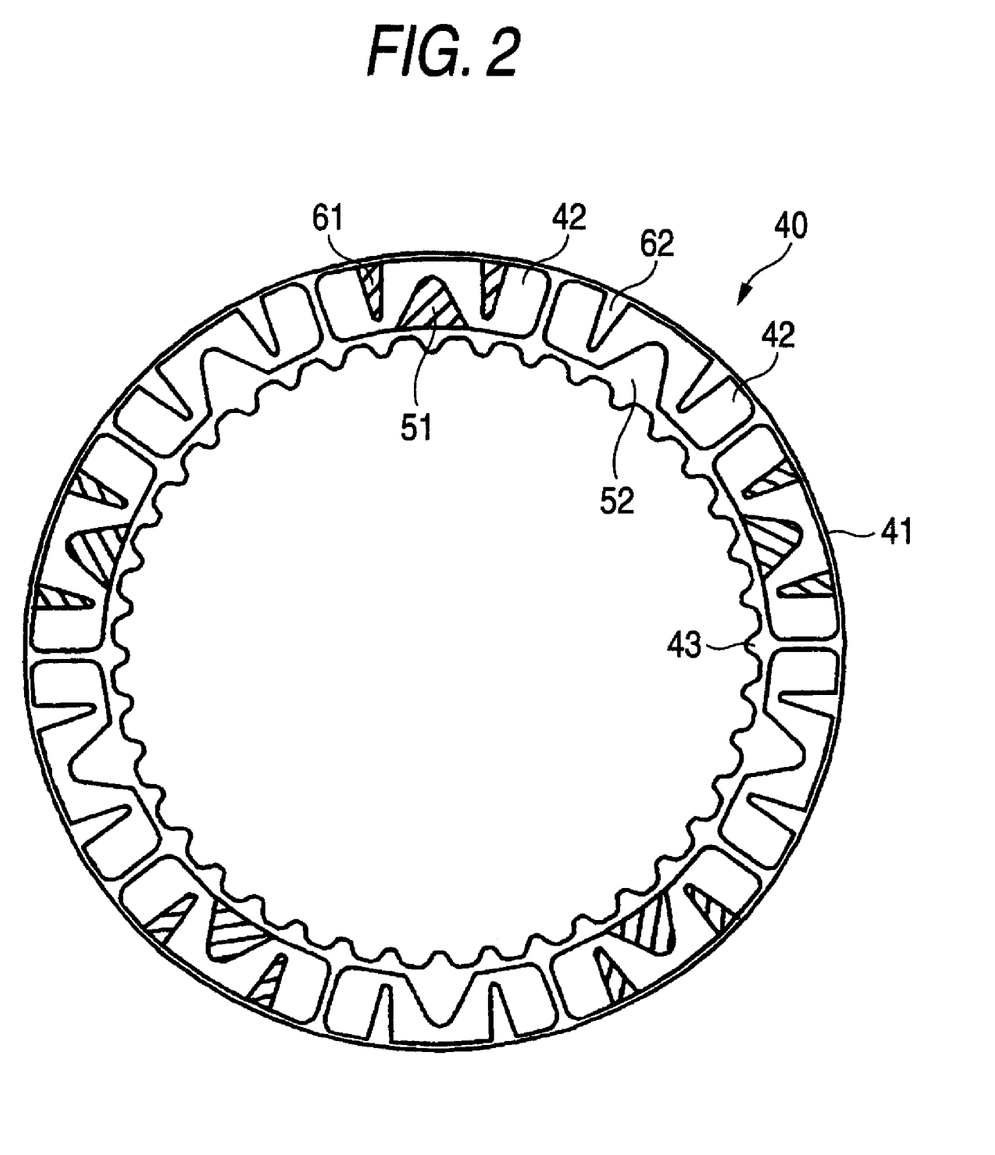
FIG. 2 is a front view of a first embodiment of a friction plate of the invention.

FIG. 2 is a front view of a first embodiment. In the first embodiment, segment pieces 42 each having a pressure molded V-shaped first oil groove 51 and pressure molded V-shaped second oil grooves 61 and segment pieces 42' each having a stamped V-shaped first oil groove 52 and stamped V-shaped second oil grooves 62 are bonded onto a core plate 41 alternately.

Each of the first oil grooves 51, 52 is made open to an inside-diameter side and has an apex at a radially middle portion of the segment pieces, and each of the second oil grooves 61, 62 is made open to an outside-diameter side and has an apex at a radially middle portion of the segment pieces.

Further, the first oil groove 51 and the second oil groove 61 are formed by press molding the segment piece 42 made of a friction material and the first oil groove 52 and the second oil groove 62 are formed by stamping out the segment piece 42' made of the frictional material.

The pressure molded oil groove has a depth which is preferably substantially 30% of a thickness of a portion onto which the pressure molding is not performed.

Further, taking into account of the processing property of the pressure molding process and the stamping out process and also required operation conditions, the materials of the first and second segment pieces 42, 42' can be made different or made the same each other.

Due to the stamped oil groove, the depth of the groove can be made large and contributes lowering the dragging torque. However, engaging torque at the initial stage becomes too large and generates large shock at the time of transmission.

On contrary, due to the pressure molded groove, the depth of the groove cannot be made large and does not contribute lowering the dragging torque effectively. However, the engaging torque at the initial stage becomes small enough and moderates the shock at the time of transmission.

Therefore, taking into account of the balance between the advantages and the disadvantages of the stamped oil groove and the pressure molded groove, the present invention provides various combination of them. Followings are concrete embodiments of the present invention. The combining manner is selected in accordance with the required situations.

Figure 3:
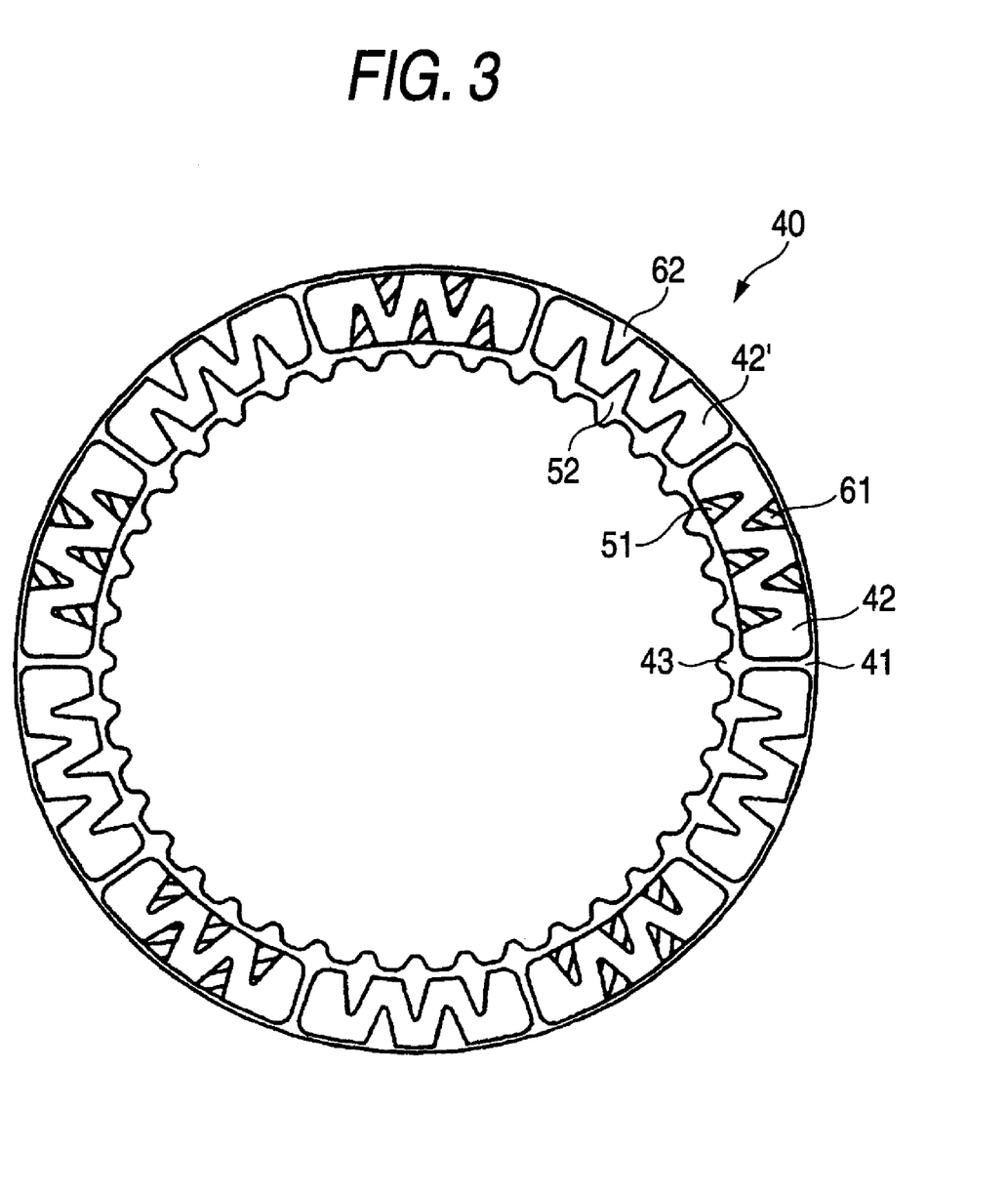
FIG. 3 is a front view of a second embodiment.

FIG. 3 is a front view of a second embodiment. In the second embodiment, three first oil grooves 51, 52 are formed on the first segment piece 42, respectively and two second oil grooves 61, 62 are formed on the second segment piece 42'.

Figure 4:
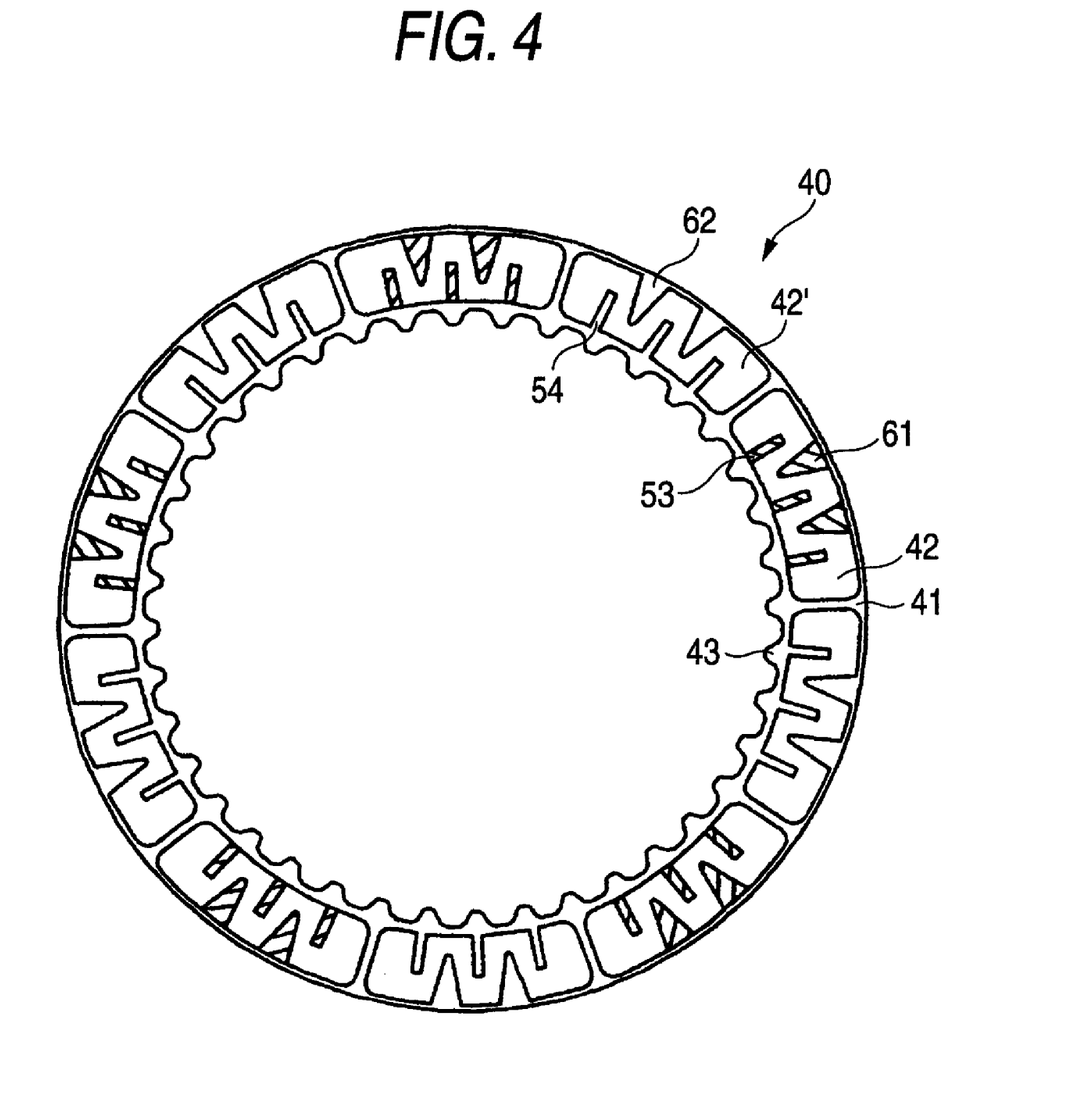
FIG. 4 is a front view of a third embodiment.

FIG. 4 shows a third embodiment. In the third embodiment, there are provided segment pieces 42 on which pressure molded quadrangular first oil grooves 53 and pressure molded V-shaped second oil grooves 61 are formed, and another segment pieces 42' on which stamped quadrangular first oil grooves 54 and stamped v-shaped second grooves 62 are formed. The segment pieces 42, 42' are bonded onto the core plate 41 alternately.

Figure 5:
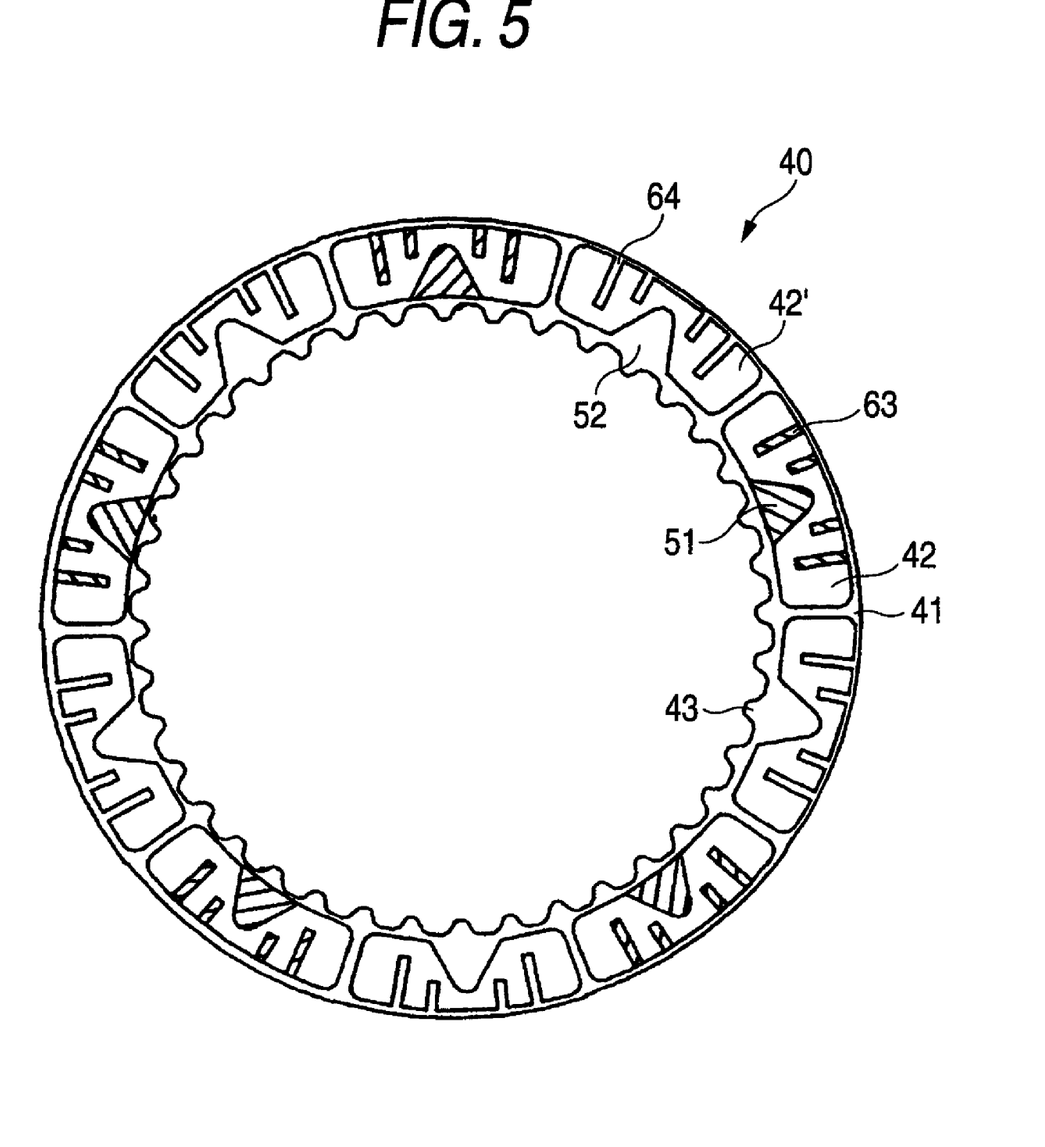
FIG. 5 is a front view of a fourth embodiment.

FIG. 5 shows a fourth embodiment. In the fourth embodiment, there are provided segment pieces 42 on which a pressure molded V-shaped first oil groove 51 and pressure molded quadrangular second oil grooves 63 are formed, and another segment pieces 42' on which a stamped V-shaped first oil groove 52 and stamped quadrangular second oil grooves 64 are formed. The segment pieces 42, 42' are bonded onto the core plate 41 alternately.

Figure 6:
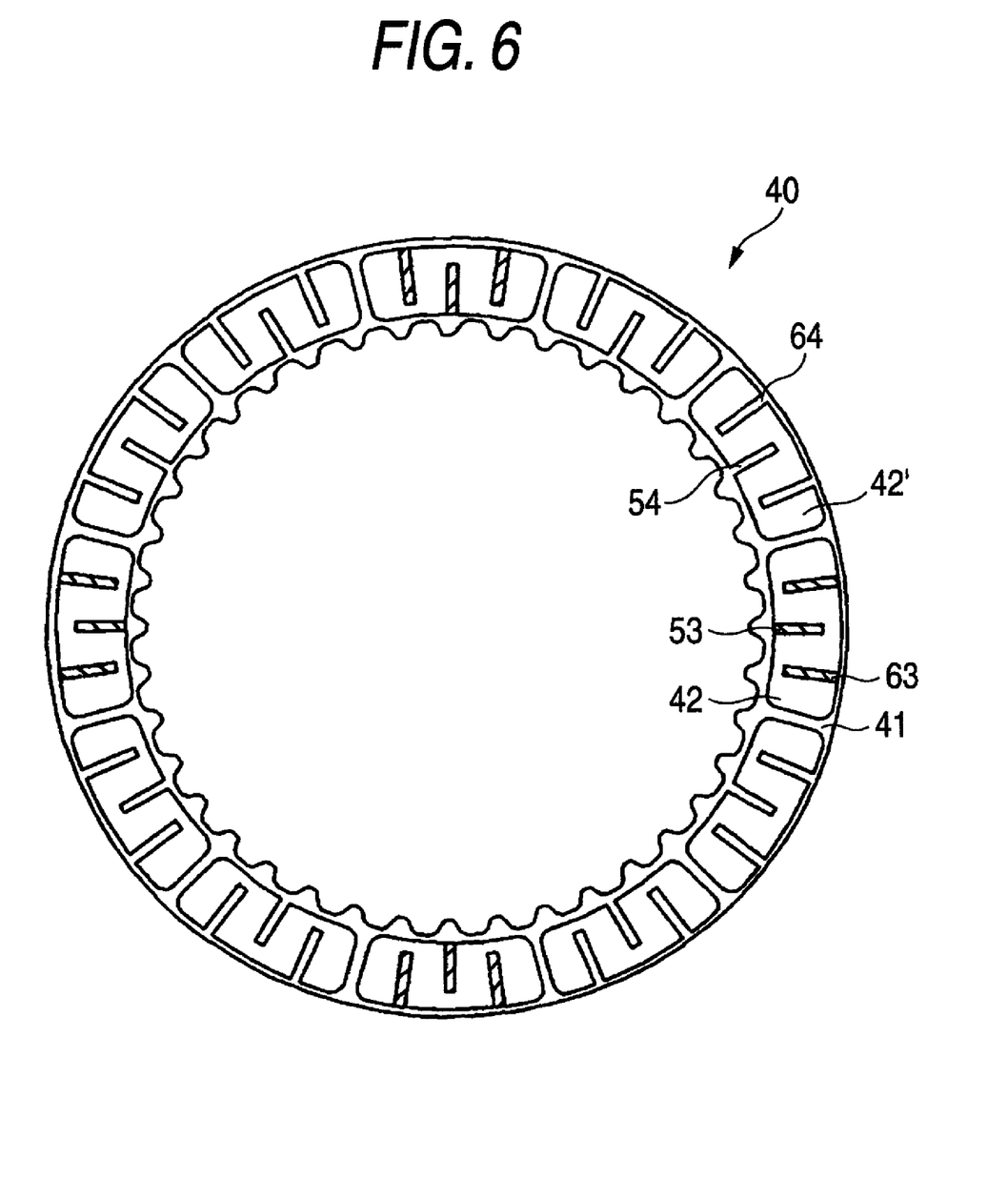
FIG. 6 is a front view of a fifth embodiment.

FIG. 6 shows a fifth embodiment. In the fifth embodiment, there are provided segment pieces 42 on which a pressure molded quadrangular oil groove 53 and pressure molded quadrangular second oil grooves 63 are formed, and another segment pieces 42' on which stamped quadrangular first oil groove 54 and stamped quadrangular second oil groove 64 are formed. The segment pieces 42, 42' are bonded onto the core plate 41 in such a manner that the segment piece 42 having the pressure molded oil grooves 53, 63 is bonded every three segment pieces 42, 42'.

Figure 7:
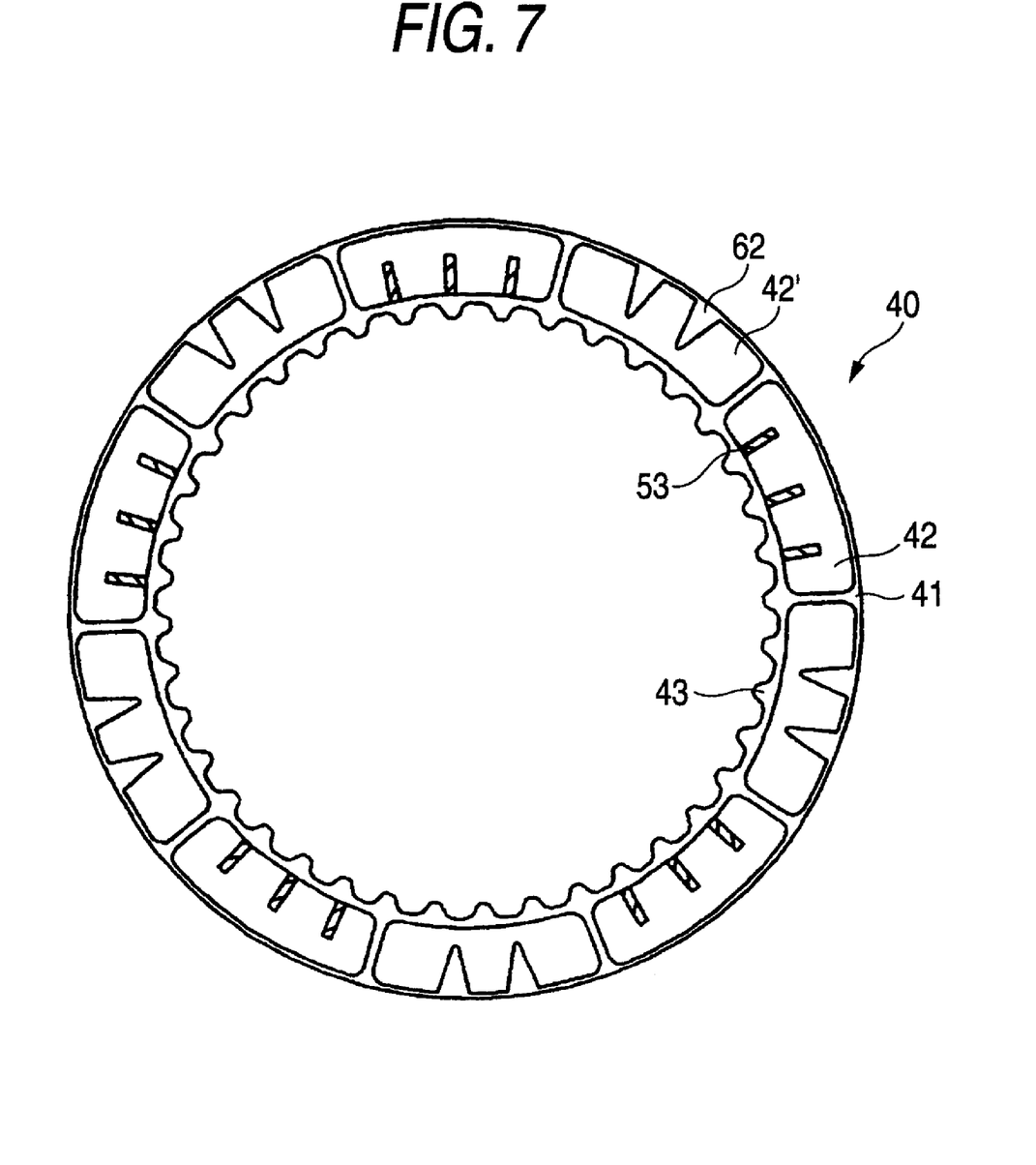
FIG. 7 is a front view of a sixth embodiment.

FIG. 7 shows a sixth embodiment. In the sixth embodiment, segment pieces 42 having pressure molded quadrangular first oil grooves 53 and segment pieces 42' having stamped V-shaped second oil grooves 62 are bonded alternately.

In this way, by arranging the oil grooves of various forms in a way required, a friction plate having a desired function can be obtained.

Figure 8:
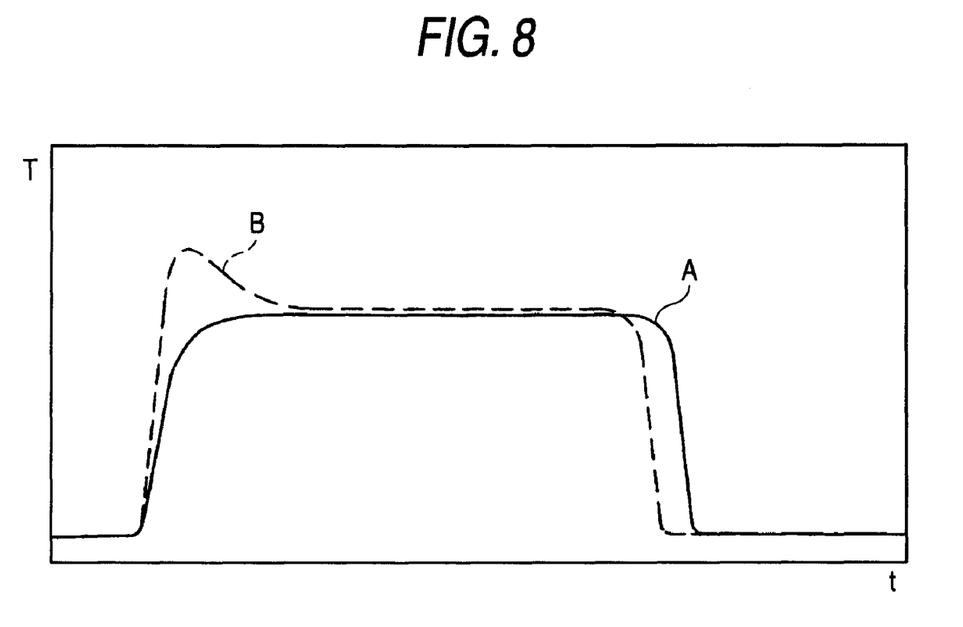
FIG. 8 is a graph showing an advantage of the invention.

FIG. 8 is a graph showing the advantage of the invention. In FIG. 8, transmitting torque is expressed by an axis of ordinates and the elapse of time is expressed by an axis of abscissas. A broken line indicates a torque transmission by a conventional clutch, and it is seen that biting is generated in an initial stage of engagement of the clutch. A solid line indicates a torque transmission by a clutch employing the friction plate of the invention, and an averaged value is shown over the whole period of engagement.

According to the invention, an automotive transmission can be made smaller in size and lighter in weight, and a reduction in fuel consumption can also be realized.

What is claimed is:

1. A friction plate for a wet multi-plate clutch comprising:
   a core plate;
   at least one first segment piece comprising at least one groove, each groove of said at least one first segment piece being a pressure molded oil groove having a depth which is less than a thickness of the at least one first segment piece; and
   at least one second segment piece comprising at least one groove, each groove of said at least one second segment piece being a stamped oil groove having a depth which is equal to a thickness of the at least one second segment piece,
   wherein the first and second segment pieces are made of friction material and are bonded onto the core plate at intervals in a circumferential direction, and
   wherein the first segment piece and the second segment piece are alternately provided.

2. The friction plate as set forth in claim 1, wherein
   each of the first and second segment pieces comprising
   a first oil groove which is made to open to an inside-diameter side of the respective segment piece and has an end portion at a radially middle part of the respective segment piece; and
   a second oil groove which is made to open to an outside-diameter side of the respective segment piece and has an end portion at a radially middle part of the respective segment piece.

3. The friction plate as set forth in claim 1, wherein
   the first segment pieces are bonded onto the core plate at equal intervals in the circumferential direction.

* * * * *